United States Patent
Kay et al.

(10) Patent No.: US 8,972,297 B2
(45) Date of Patent: Mar. 3, 2015

(54) SYSTEM AND METHOD FOR CONDUCTING A TRANSACTION AT A FINANCIAL TRANSACTION TERMINAL USING A MOBILE DEVICE

(75) Inventors: Christopher Eric Kay, Palo Alto, CA (US); Ricardo Outi, Waterfall Gardens (SG); Sopnendu Mohanty, Pebble Bay (SG); Mavanur Narakesari Rangaraj, The Gardens at Bishan (SG); Jonathan Christian Larsen, The Peak (HK)

(73) Assignee: Citibank, N.A., New York, NY (US)

( * ) Notice: Subject to any disclaimer, the term of this patent is extended or adjusted under 35 U.S.C. 154(b) by 140 days.

(21) Appl. No.: 13/296,336

(22) Filed: Nov. 15, 2011

(65) Prior Publication Data
US 2013/0124410 A1    May 16, 2013

(51) Int. Cl.
*G06Q 10/00* (2012.01)
*G06Q 40/02* (2012.01)
*G07F 19/00* (2006.01)
*G06Q 20/32* (2012.01)

(52) U.S. Cl.
CPC .............. *G06Q 40/02* (2013.01); *G07F 19/211* (2013.01); *G06Q 20/3223* (2013.01)
USPC ............................................ 705/43; 705/1.1

(58) Field of Classification Search
CPC ... H04W 64/00; G07F 19/20; G06Q 20/1085; G06Q 20/3223; G06Q 20/322; G06Q 20/3221
USPC ........................................................ 705/1.1
See application file for complete search history.

(56) References Cited

U.S. PATENT DOCUMENTS

| 8,127,983 | B1* | 3/2012 | Block et al. .................... 235/379 |
|---|---|---|---|
| 2004/0164898 | A1* | 8/2004 | Stewart ......................... 342/386 |
| 2006/0206709 | A1* | 9/2006 | Labrou et al. ................. 713/167 |
| 2009/0328052 | A1* | 12/2009 | Nguyen et al. ................ 718/104 |
| 2010/0017327 | A1* | 1/2010 | Treadwell et al. .............. 705/43 |
| 2010/0040029 | A1 | 2/2010 | Doppler et al. |
| 2011/0016047 | A1 | 1/2011 | Wu et al. |
| 2011/0047075 | A1 | 2/2011 | Fourez |
| 2011/0191243 | A1* | 8/2011 | Allen .............................. 705/43 |
| 2011/0238573 | A1* | 9/2011 | Varadarajan ................... 705/43 |
| 2011/0246316 | A1* | 10/2011 | Cincera .......................... 705/17 |

OTHER PUBLICATIONS

International Search Report and Written Opinion dated Feb. 1, 2013 in corresponding International Application No. PCT/US2012/064935, 8 pages.

* cited by examiner

*Primary Examiner* — William Rankins

(74) *Attorney, Agent, or Firm* — Eric L. Sophir; Dentons US LLP

(57) ABSTRACT

The systems and methods described herein allow greater access to a banking platform via a mobile device. The customer can initiate a financial transaction using a mobile device, a bank can inform the customer of the nearest financial transaction terminal to perform that service, and the customer can complete that financial transaction at the financial transaction terminal using the mobile device as a user interface. While conventional systems may use a mobile device to transmit payment information at a point of sale terminal of a brick-and-mortar merchant, the embodiments described herein can allow a customer to conduct a transaction at a financial transaction terminal using the mobile device to initiate a transaction at a location away from a financial transaction terminal, to locate the nearest financial transaction terminal providing the required services, and as a user interface while communicating with the financial transaction terminal.

21 Claims, 6 Drawing Sheets

SYSTEM AND METHOD FOR CONDUCTING A TRANSACTION AT A FINANCIAL TRANSACTION TERMINAL USING A MOBILE DEVICE

FIELD OF THE INVENTION

The present invention relates generally to the use of a mobile device to conduct a transaction at a financial transaction terminal.

BACKGROUND

In the conventional use of an automated teller machine (ATM), a customer dips a card and enters a personal identification number (PIN) for authorization. Once authorized, the customer can select whether to withdraw cash, make a deposit, or transfer money between accounts. If there are multiple accounts, the customer can then choose which account to use for this transaction. In some instances, like withdrawing cash, the customer enters an amount for the transaction. The ATM will process the transaction. The ATM can then print a receipt for the customer.

In this conventional use of an ATM, however, there are some drawbacks. A customer may not know where the nearest ATM is located. Also, the customer may be concerned with security issues by conducting the entire transaction at the ATM. Additionally, the nearest ATM may not provide the functionality that is desired by the customer.

SUMMARY OF THE INVENTION

The systems and methods described herein attempt to cure the deficiencies of the conventional systems by attempting to allow greater access to a banking platform via a mobile device. In the exemplary embodiment, the customer can initiate a financial transaction using a mobile device, a bank can inform the customer of the nearest financial transaction terminal to perform that service, and the customer can complete that financial transaction at the financial transaction terminal using the mobile device as a user interface. While conventional systems may use a mobile device to transmit payment information at a point of sale terminal of a brick-and-mortar merchant, the embodiments described herein can allow a customer to conduct a transaction at a financial transaction terminal using the mobile device to initiate a transaction at a location away from a financial transaction terminal, to locate the nearest financial transaction terminal providing the required services, and as a user interface while communicating with the financial transaction terminal.

In one embodiment, a method for conducting a transaction using a mobile device comprises receiving, by a mobile device, a request from a user to conduct a transaction using a financial transaction terminal; determining, by the mobile device, a location of the user; transmitting, by the mobile device to a bank server, the location of the user and the requested transaction; receiving, by the mobile device from the bank server, a location of the nearest financial transaction terminal for conducting the requested transaction; establishing, by the mobile device, a communication session with the nearest financial transaction terminal; and receiving, by the mobile device, a prompt from the financial transaction terminal for the user to complete the requested transaction.

In another embodiment, a method for conducting a transaction comprises receiving, from a mobile device, a request from a user to conduct a transaction using a financial transaction terminal; receiving, from the mobile device, a location of the user and the requested transaction; determining, by a computer, a location of the financial transaction terminal for conducting the requested transaction; establishing a communication session with the mobile device at the financial transaction terminal; and completing the transaction using the financial transaction terminal.

In yet another embodiment, a non-transitory computer readable medium having computer readable program code therein, the computer readable program code adapted to be executed by a processor to implement a method for conducting a transaction comprises providing a system, wherein the system comprises software modules, and wherein the software modules comprise a user interface module, a location module, a transmission module, and a session module; receiving, by the user interface module, a request from a mobile device of a user to conduct a transaction using a financial transaction terminal; determining, by the location module, a location of the user; transmitting, by the transmission module, the location of the user and the requested transaction; receiving, by the transmission module, a location of the nearest financial transaction terminal for conducting the requested transaction; establishing, by the session module, a communication session with the nearest financial transaction terminal; and receiving, by the session module, a prompt from the financial transaction terminal for the user to complete the transaction.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The preferred embodiments of the present invention are illustrated by way of example and not limited to the following figures.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

The systems and methods described herein can allow a customer to initiate a financial transaction on a mobile device, a bank can inform the customer of the nearest financial transaction terminal to perform that service, and the customer can complete that financial transaction at the financial transaction terminal using the mobile device as a user interface.

Figure 1:
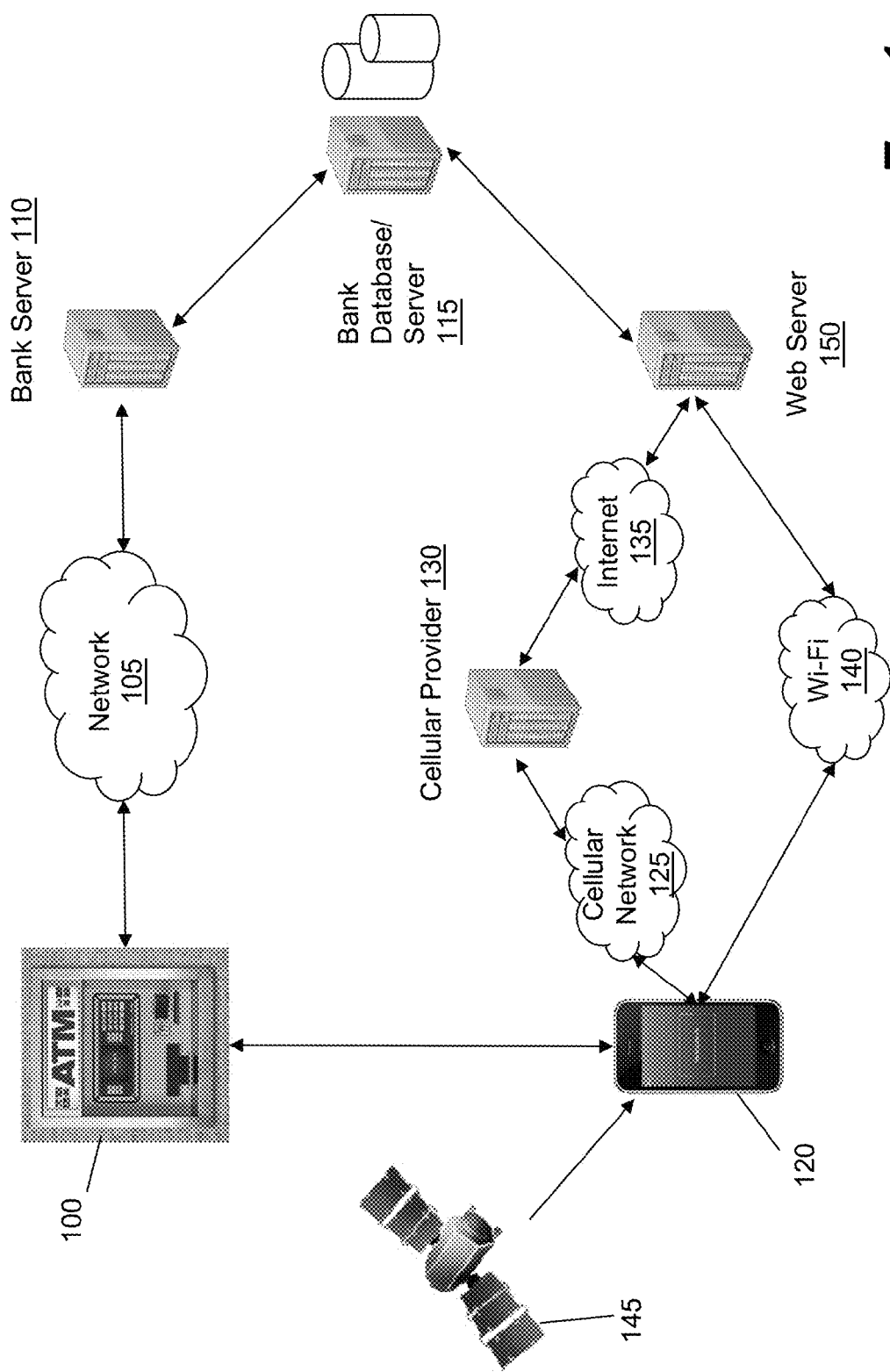
FIG. 1 shows a system architecture according to an exemplary embodiment.

Referring to FIG. 1, a system overview is shown according to an exemplary embodiment. A financial transaction terminal 100 can include an automated teller machine (ATM), a customer activated terminal (CAT), cash machine, or any other terminal where a customer can conduct a financial transaction. Financial transactions include, but are not limited to, deposits, withdrawals, account transfers, stock transactions, loan applications, credit card or debit card or check card issuance or replacement, certified or bank check printing, account balance, account openings and closings, credit card cash advances, purchase prepaid mobile phone credits, exchange currency, and payments. In one embodiment, the financial transaction terminal 100 is limited to the functionality of a conventional ATM. In another embodiment, the financial transaction terminal 100 has more functionality than a conventional ATM. In yet another embodiment, the financial transaction terminal 100 allows a customer to conduct a transaction, but does not include the functionality of a point of sale terminal.

In this exemplary embodiment, the financial transaction terminal 100 has the functionality of an ATM. The financial transaction terminal is connected to a network, such as an ATM network 105. The ATM network 105 connects a plurality of financial transaction terminals 100 to a bank server 110.

The financial transaction terminal 100 can be located in a variety of locations. For example, the financial transaction terminal 100 can be located at a branch, an airport, a shopping mall, a gas station, a rest stop, a grocery store, a school, a restaurant, a cruise ship, a hotel, a pharmacy, a ticket counter, a subway or public transportation station, or any other location. The financial transaction terminal 100 can be located inside or outside of the location, and can be a stand-alone unit, a built-in unit, or a drive-through unit.

The network 105 can be an interbank network. The interbank network allows customers to use financial transaction terminals that are not affiliated with the acquiring bank. The interbank network also allows customers to conduct transactions in a local currency that may differ from their hometown currency. In some instances, a fee may be charged to the customer when the financial transaction terminal is not affiliated with the customer's acquiring bank. For example, a customer can use an ATM card at any ATM on an ATM network. However, some services may not be available to an ATM cardholder of a bank other than the acquiring bank.

Figure 2A:
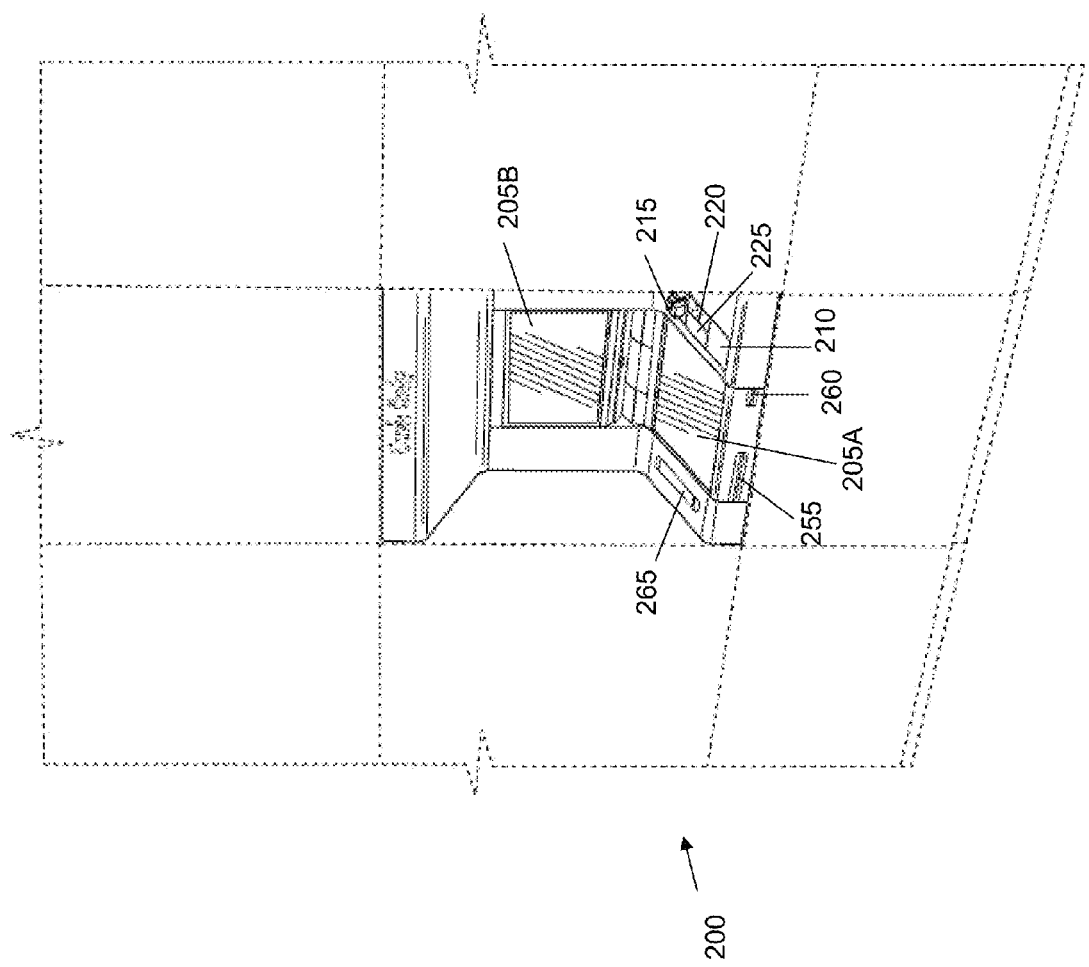
FIGS. 2A and 2B show a financial transaction terminal according to an exemplary embodiment.
Figure 2B:
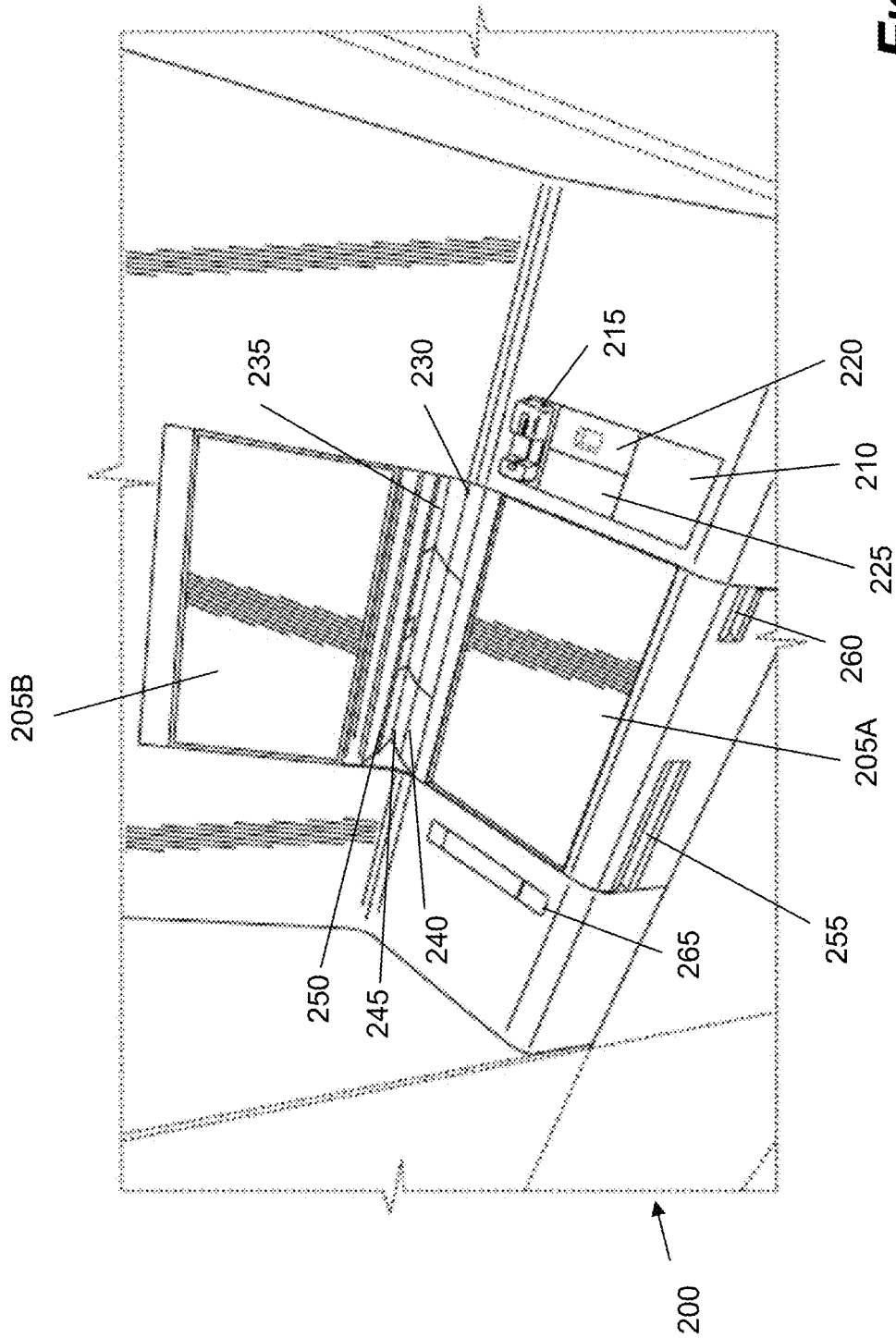

Referring to FIGS. 2A and 2B, an exemplary financial transaction terminal 200 is shown. In this exemplary embodiment, the financial transaction terminal 200 is an ATM, though it is intended that the financial transaction terminal is not limited solely to ATMs. The financial transaction terminal 200 has a central processing unit (not shown) for processing transactions and requests, a cryptoprocessor (not shown) for encrypting and decrypting data transmitted to and from the financial transaction terminal 200, and a communications interface (not shown) for communicatively coupling the financial transaction terminal 200 to the network. These components may be coupled to each of the other components of the financial transaction terminal 200, even if such a connection is not explicitly described herein.

The financial transaction terminal 200 has a first display 205A and a second display 205B. Either, both, or neither of the displays 205A, 205B can be touchscreen devices. A keypad or other input device can be included on the financial transaction terminal 200 to supplement or replace any touchscreen functionality of displays 205A, 205B. Additionally, the financial transaction terminal 200 can have a single display, which can be either display 205A or display 205B. An input device (not shown), such as a personal identification number (PIN) pad, keypad, keyboard, or mouse, can be located at an input device location 210.

The financial transaction terminal 200 can have a card reader 2150. The customer can swipe, dip, enter, or wave a card using the card reader 215. The card reader 215 can read a debit card, credit card, check card, smart card, transaction card, or other card, such as an identification card. The customer can use the card reader 215 to initiate a session with the financial transaction terminal or use the card reader 215 for identification purposes.

The financial transaction terminal 200 can also have a biometric reader 220. The biometric reader 220 can be a fingerprint reader, iris/retina scanner, facial recognition scanner, hand scanner, voice recognition microphone, or other biometric reading device. The biometric reader 220 of the financial transaction terminal 200 can be used for verification or identification purposes.

The financial transaction terminal 200 has a mobile communications interface device 225. The mobile communications interface device 225 can be a near field communication (NFC) device that allows for sharing information with another NFC device, which can be located in a mobile phone, a smart phone, a tablet, a credit card, a keycard, a keyfob, a sticker, a tab, or the like. By tapping the mobile communications interface device 225 with the other NFC device (e.g., a mobile phone), the NFC device can communicate with the financial transaction terminal 200 via the mobile communications interface device 225. The mobile communications interface device 225 can operate in passive communication mode, whereby an initiator device provide a carrier field and the mobile communications interface device 225 answers by modulating an existing field, or vice versa. Alternatively, the mobile communications interface device 225 can operate in active communication mode, whereby the initiator and target device communicate by alternately generating their own fields. In an alternative embodiment, the mobile communications interface device 225 can use Bluetooth, WiFi, infrared, or radio frequency identification (RFID) pairing technology to allow the financial transaction terminal 200 to communicate with a mobile device, such as a mobile phone.

The financial transaction terminal 200 can dispense cash through a cash dispenser 230. The cash dispenser 230 can be coupled to one or more cash cartridges inside or connected to the financial transaction terminal 200. The financial transaction terminal 200 can also receive cash through a cash receiver 235. The cash receiver 235 can be coupled to one or more cash cartridges inside or connected to the financial transaction terminal 200.

The financial transaction terminal 200 can dispense a variety of items to the customer. A printer 240 can print a receipt for a transaction, a coupon, or other information at the request of the customer. A check printer 245 can print checks, such as a personal check, a certified check, or a bank check. A card printer 250 can print, emboss, label, or output a card, such as a debit, credit, or check card, to the customer.

The financial transaction terminal 200 can receive data from the customer for identification or verification. The financial transaction terminal 200 can have a scanner 255 for scanning passports, statements, bills, invoices, letters, or other documents. An identification scanner 260 can be used to scan a drivers license or other identification card or document that may not be read by the card reader 215. A handset 265 may be available on the financial transaction terminal 200 for the customer to have a direct communication line with the bank.

The financial transaction terminal 100 connects over the network 105 to the bank server 110. Within the network 105, the financial transaction terminal may connect over of a telephone network or internet to a host computer (not shown), which may be connected over a telephone network or internet to the bank server 110. The host computer can be coupled to a plurality of financial transaction terminals and/or a plurality of computers for different banks, such as the bank server 110. The host computer may be operated by a bank or another entity.

The bank server 110 can receive transaction requests from the financial transaction terminal 100 and provide information to the financial transaction terminal 100. The bank server 110 can assist the financial transaction terminal 100 in verifying a customer or a request, identifying a customer, routing a transaction for processing, providing account information, or another function involving bank processes or processes that cannot be handled by the financial transaction terminal 100 alone.

The bank server 110 can communicate with a bank database/server 115. The bank database/server 115 can include one or more specially-programmed servers that can be coupled to one or more databases. The bank database/server 115 performs the banking transactions requested by the customer at the financial transaction terminal 100, such as account transfers, payments, debiting an account for cash withdrawal, and security verification. The database(s) of the bank database/server 115 can store information about the customer, including account information, security and biometric information, demographic information, customer identification information (e.g., customer address, drivers license number, social security number), and customer preferences (e.g., default location).

The customer has a mobile device 120, such as a cellular or mobile phone, a smart phone, a tablet, a personal data assistant (PDA), a laptop computer, or the like. In this exemplary embodiment, the mobile device 120 is a mobile phone. The mobile device 120 can communicate by sending and receiving transmissions using its cellular phone capabilities, a Wi-Fi connection, a Bluetooth connection, or the like. The mobile device 120 can have the capability of sending and receiving data over the internet, sending and receiving e-mail messages, sending and receiving SMS text messages, placing and receiving voice calls, and any other known communications interface.

The mobile device 120 can communicate over a cellular network 125 to a cellular provider 130. The cellular provider 130 can determine where to route a message or request, such as an SMS text message, an e-mail message, or an internet request. When the request is an internet request, the cellular provider 130 routes the request over the internet 135 accordingly. When the cellular provider 130 receives a request (e.g., an internet data transmission, an e-mail, an SMS text message) for the mobile device 120, the cellular provider 130 transmits the information over the cellular network 125 to the mobile device 120.

The mobile device 120 can also communicate over a Wi-Fi network 140. In the Wi-Fi network 140, a Wi-Fi access device (not shown) can act as a wireless access point or hotspot to the internet for one or more mobile devices. Wi-Fi can provide internet connectivity to a limited range, a room, a building, a campus, a city, or based on any other geographic boundary. The Wi-Fi access device can be a personal computer, a video game console, an MP3 player, a smart phone, a digital camera, an antenna, or other wireless routing device. When the mobile device 120 is within reach of the Wi-Fi access device, the mobile device can connect to the Wi-Fi network 140. To initiate the connection, the customer may need to enter a password or click through an internet webpage to gain access to the connectivity.

The mobile device 120 can be configured to communicate with the mobile communications interface device of the financial transaction terminal 100. For example, the mobile device 120 can have an NFC chip for communicating payment information with an NFC device of the financial transaction terminal 100. As a result, the mobile device 120 can be used to communicate with the financial transaction terminal 100 when the mobile device 120 is tapped on the financial transaction terminal 100 or is within a certain proximity of the financial transaction terminal 100. The NFC chip of the mobile device 120 can be built or provided in the mobile device 120, attached as a label or sticker to the mobile device 120, or provided in a case or holder of the mobile device 120. Alternatively, the mobile device 120 can include an RFID device or other device for communicating with the financial transaction terminal 100.

The mobile device 120 can use location-based services to identify the location of the mobile device 120. The location of the mobile device 120 can be determined using global positioning system (GPS), Wi-Fi, cellular phone towers, or other services. For example, when using a GPS, the mobile device 120 acts as a receiver to receive location and time information from a satellite 145. Alternatively, the mobile device 120 can use Wi-Fi or cellular phone towers to compute the location of the mobile device 120. The mobile device 120 can transmit the location and time information via the cellular network, Wi-Fi connection, or other network to a web server 150.

The web server 150 is a specially-programmed computer that is configured to communicate, including both sending and receiving, information to/from the bank over a network, such as the internet 135 or a Wi-Fi connection 140. The web server 150 can receive a request from a mobile device 120 for a webpage to be displayed on a browser of the mobile device 120. The web server 150 will transmit the webpage along with any data to populate the webpage that can be provided by the database/server 115. Additionally, the mobile device 120 can request information using an application (or "app") from the web server 150. The web server 150 will transmit the webpage along with any data to populate the webpage that can be provided by the database/server 115. When the mobile device 120 sends information to the web server 150, the web server 150 can transmit some of the information, such as payment instructions or account changes, to the database/server 115.

Figure 3:
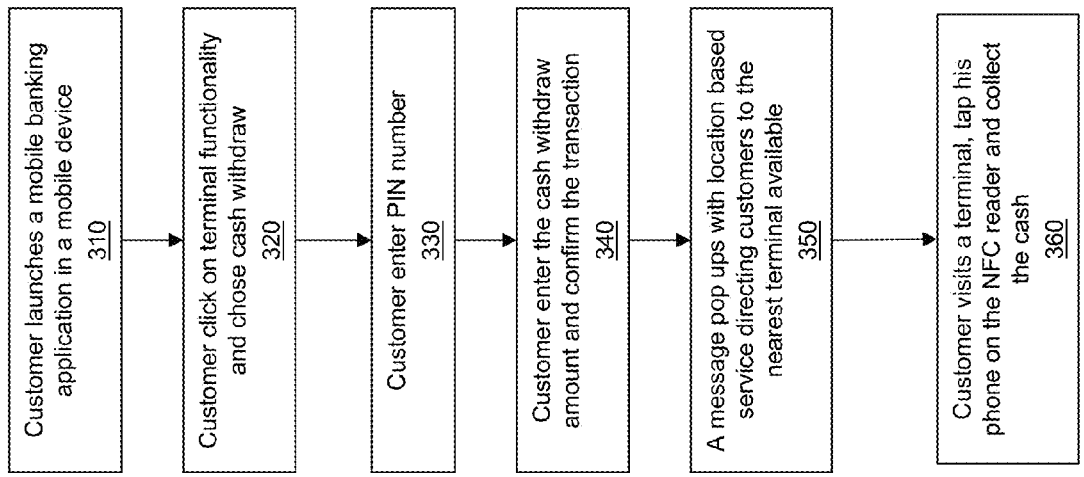
FIG. 3 shows a method of withdrawing cash from a financial transaction terminal using a mobile device according to an exemplary embodiment.

Referring to FIG. 3, a method of withdrawing cash from a financial transaction terminal using a mobile device is shown. In 310, a customer launches a mobile banking application on the mobile device. The mobile banking application can be an application (or "app") or can be a webpage accessed using a browser of the mobile device. In this example, the customer launches an application. As shown in FIG. 4B, a mobile device 400 presents on its display a splash screen 405 that says "Welcome to Citi Mobile." When initiating the transaction, whether by logging into the mobile banking application or selecting a particular service, the customer can be located anywhere and does not need to be in the proximity of a financial transaction terminal or a branch. During this process, the customer will be informed which financial transaction terminal can be used to complete the transaction, but the customer does not need to be in the vicinity of the financial transaction terminal until the customer decides to complete the transaction.

The mobile banking application can be configured to interact or integrate with a mobile wallet application. The mobile wallet application can be an application (or "app") or can be a web page accessed using a browser of the mobile device. The mobile wallet application can allow a user to wirelessly conduct transactions (e.g., payments, account transfers) using one or more accounts of the customer without a credit card or debit card present and without visiting a branch or financial transaction terminal. In one configuration, a single application can have the functionality of both the mobile banking application and the mobile wallet application.

In 320, the customer chooses to withdraw cash from a financial transaction terminal. In this particular example, the customer is withdrawing cash from the financial transaction terminal, however, the customer can perform a variety of banking functions using the mobile device. The customer can choose a category of instructions or transactions, such as those to be performed at a financial transaction terminal. As shown in FIG. 4B, a mobile device 400 has received a request to conduct a transaction at a financial transaction terminal, such as an ATM though not limited to ATMs, and is presenting on the display of the mobile device 400 a user interface labeled as "Citi ATM" 410 and presenting options for "withdraw" 415 and "deposit" 420. The customer can select withdraw 415 to withdraw cash from the financial transaction terminal. The request from the customer to withdraw cash is transmitted from the mobile device 400 via a Wi-Fi network or cellular network to the web server of the bank. The bank then transmits instructions to be displayed on the app or web browser of the mobile device 400 based upon the received request.

In 330, the customer enters a personal identification number (PIN). Although this exemplary embodiment has the customer enter the PIN after choosing whether to withdraw cash or make a deposit, it is intended that the customer can enter the PIN at any point in the process to allow the customer to receive access to account information and for the bank to provide authorization to the customer to complete the transaction. Alternatively, the customer can enter other authentication information, such as a username and password or a biometric credential. The customer's authentication information, credentials, and/or account information can be stored in memory used with the mobile device, such as a subscriber identity module (SIM) card, which may be separate from the memory of the mobile device and accessible by only authorized applications of the mobile device.

Figure 4C:
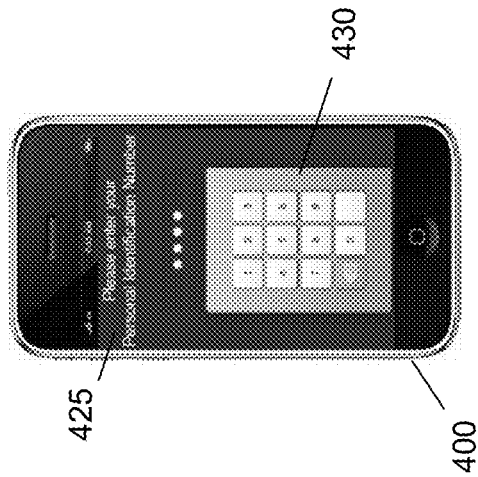
FIGS. 4A to 4F show the use of a mobile device to withdraw cash from a financial transaction terminal according to an exemplary embodiment.
Figure 4B:
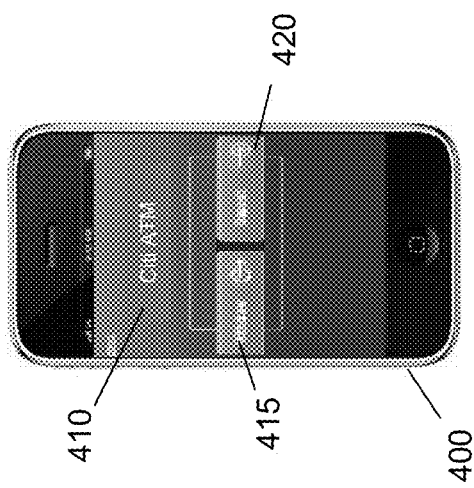
Figure 4A:
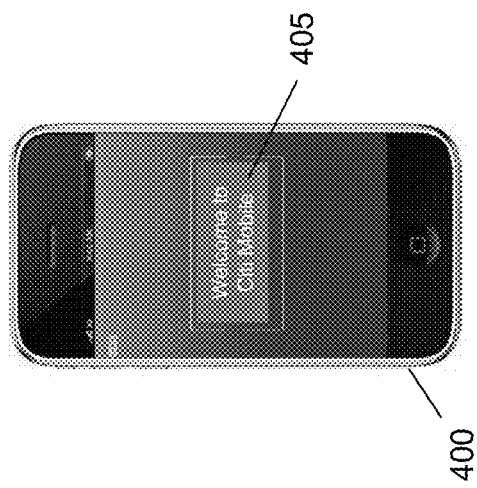

As shown in FIG. 4C, a mobile device 400 has a user interface that prompts the customer to "Please enter your Personal Identification Number" 425 using a keypad 430 on a touchscreen of the mobile device 400 or a mobile device keyboard or keypad (not shown). The entered PIN is transmitted via a Wi-Fi network or cellular network and received by the bank's web server. The bank's web server can authorize the customer by sending a request to the bank database/server. The database/server can confirm the customer's credentials and authorize the transaction. The database/server will inform the web server to allow the customer to proceed with the transaction.

Figure 4F:
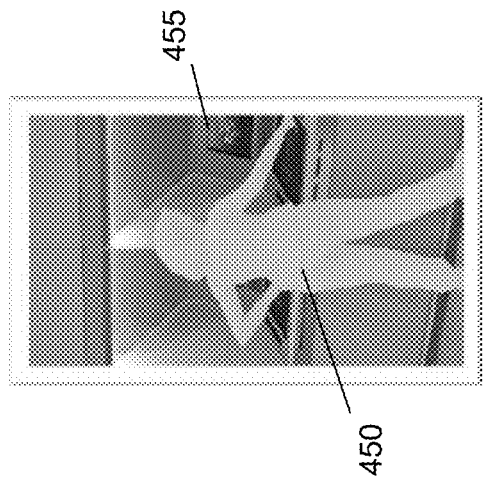

In 340, the customer enters the amount of cash to withdraw and confirms the transaction. As shown in FIG. 4D, a mobile device 400 has a user interface that prompts the customer to "Enter Cash Amount" 435 using a keypad 440 on a touchscreen of the mobile device 400 or a mobile device keyboard or keypad (not shown). The entered cash amount is transmitted via a Wi-Fi network or cellular network and received by the bank's web server. The web server transmits this information to the bank's database/server. The bank's database/server processes the request by checking for available funds and holding those funds. The database/server may be programmed to debit those funds from the account before, during, or after the actual withdrawal of the cash from a financial transaction terminal.

In one alternative embodiment, the mobile device 400 can prompt the customer to enter the cash amount in a local currency or a currency of the customer at home. In order to determine the local currency, the mobile device can use location based services, GPS, cellular networks, or any other location-identifying mechanism. In order to determine the home currency, the mobile device can access information about the customer in a record in the bank's database/server by sending a request via the web server for this information. As another alternative, the mobile device can prompt the customer to select the currency from a list of available currencies. The list of available currencies may be a list of currencies such that nearby financial transaction terminals can provide cash in at least one of those currencies. Alternatively, the list of available currencies can be a list of currencies that will be converted using a currency exchange rate to the currency of the nearby financial transaction terminals.

Once the bank has processed the request to withdraw cash, the bank will determine the location of the mobile device and the location of the nearest financial transaction terminals that can satisfy this request. The bank determines the location of the mobile device by requesting information from the mobile device regarding its location. The mobile device receives this information from GPS, cellular networks, or other mechanisms to identify its location. The bank can compare the location of the mobile device with the locations of the financial transaction terminals, which are all at fixed locations. The bank can identify the nearest financial transaction terminal to the mobile device that can allow the customer to withdraw the requested cash.

In 350, a message is presented to the customer directing the customer to the nearest financial transaction terminal available. The bank's database/server transmits to the web server a location of the nearest financial transaction terminal, e.g., at ABC Plaza, which in turn will transmit the location to the mobile device for display to the customer. At about the same time, the bank's database/server will transmit the cash withdrawal request to the bank server. The bank server may limit only the selected financial transaction terminal as the only terminal that can process this request from the mobile device. In an alternative embodiment, the bank server can allow multiple financial transaction terminals to process the transaction.

Figure 4E:
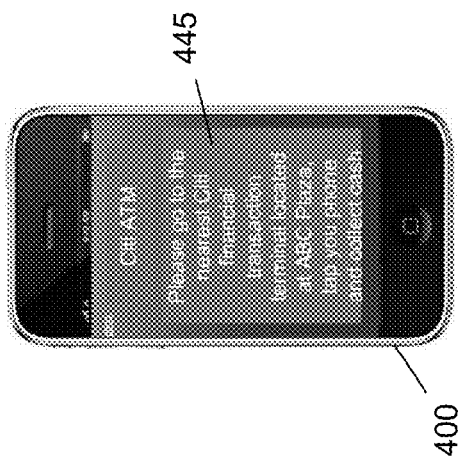
Figure 4D:
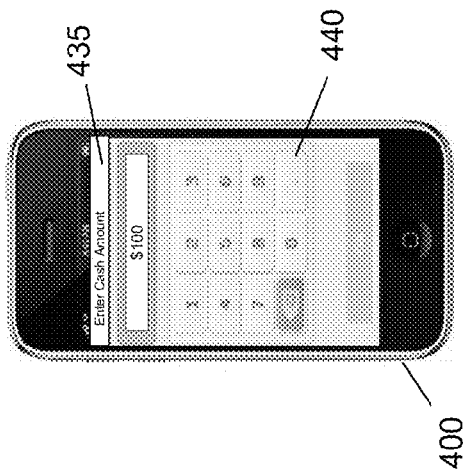

Referring to FIG. 4E, a mobile device 400 is shown with a user interface that prompts the customer to "Please go to the nearest Citi financial transaction terminal located at ABC Plaza, tap the phone and collect cash" 445. In an alternative embodiment, the mobile device 400 can provide the customer with a map, directions, or connect with the mobile device's navigation features to direct the customer to the location of the financial transaction terminal.

In determining the nearest financial transaction terminal, the bank's database/server uses the location of the mobile device and identifies the nearest terminal that can perform the requested service. The status of each financial transaction terminal can be stored in a database, such as the bank's database/server, and it can be updated in substantially real time. Optionally, before recommending that the customer visit that financial transaction terminal, the bank's database/ server can inquire about the status of that financial transaction terminal to see that the functionality for that requested service is operational. For example, if the customer desires to withdraw cash, the bank will check to see that the financial transaction terminal's cash withdrawal functionality is properly operating, and then that financial transaction terminal may be listed as an available terminal for this transaction. If the desired functionality is not available, the customer will be directed to another financial transaction terminal.

If the customer does not want to use the nearest financial transaction terminal, the customer can decline the selected financial transaction terminal and choose to visit the next closest financial transaction terminal that provides the requested services. In selecting the next closest financial transaction terminal, the web server informs the bank database/server, which in turn informs the bank server. The bank server can cancel the request for authorization of a first financial transaction terminal and authorize the use of a second financial transaction terminal.

For security purposes, the customer may be given a limited amount of time to complete the transaction at the financial transaction terminal. The amount of time may be based on the customer's proximity to the financial transaction terminal. For example, if the customer is within 0.1 miles, the customer is given 30 minutes, but if the customer is within 5 miles, the customer is given 1 hour. Alternatively, the amount of time can be based on the type of transaction. For example, a cash withdrawal is given 30 minutes, and a cash deposit is given 1 hour. In another configuration, the customer can be asked to input a time or amount of time to complete the transaction. For example, the customer may choose to allow only 10 minutes for the transaction or 1 hour for the transaction. In one embodiment, when the designated amount of time is about to expire, the customer is given an option to extend the amount of time further.

In 360, the customer visits the financial transaction terminal, taps the mobile device on the NFC reader of the financial transaction terminal, and collects the cash. As shown in FIG. 4F, a customer 450 visits a financial transaction terminal 455 that was identified by the bank as the nearest financial transaction terminal that can perform this service (e.g., withdraw cash). The customer taps the mobile device on the NFC reader of the financial transaction terminal to identify the customer and initiate a communication session with the financial transaction terminal. The use of NFC can allow communication between the mobile device and the financial transaction terminal for identification protocols and a secure data transfer. The NFC communication session may operate in a 13.56 MHz frequency band over a distance of about 20 centimeters.

The communication session may involve the transmission of wireless signals between the mobile device and the financial transaction terminal. Once a connection is established between the mobile device and the financial transaction terminal, the mobile device may transmit data to the financial transaction terminal to identify the mobile device or the customer. Alternatively or in addition, the financial transaction terminal may require the entry of authentication information by the customer. Alternatively, other mechanisms can be used to communicate between the financial transaction terminal and the mobile device, such as Bluetooth or Wi-Fi.

The financial transaction terminal may use a display of the financial transaction terminal to communicate with the customer, or alternatively, the financial transaction terminal may use a display of the mobile device to communicate with the customer. The financial transaction device may require the customer to enter the PIN for authorization using the financial transaction terminal or the mobile device. Once authorized, the financial transaction terminal can prompt the customer, using the financial transaction terminal or the mobile device, that cash is being dispensed from the financial transaction terminal. During the communication session between the financial transaction terminal and the mobile device, the financial transaction terminal transmits to and receives information from the bank regarding the requested transaction, authentication information of the customer, and account information of the customer. During the communication session, the financial transaction terminal also transmits to and receives information from the mobile device regarding the requested transaction, authentication information of the customer, account information of the customer, confirmation by the customer, and input from the customer into the mobile device for commanding the financial transaction terminal.

Once the customer performs the transaction at the financial transaction terminal, the customer can receive a receipt for the transaction, and the customer may receive an option regarding whether to receive one. In one embodiment, the financial transaction terminal can print a receipt. In another embodiment, a receipt can be e-mailed to an e-mail address associated in the customer's records with that mobile phone or another device. The receipt can be included as text or an image in the body of the e-mail message, or the receipt can be attached to the e-mail message. In yet another embodiment, a receipt can be sent via SMS text message to a phone number associated in the customer's records with that mobile phone or another device. The receipt can be included as text or an image in the body of the SMS text message, or the receipt can be attached to the SMS text message.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices. The system can be installed on a mobile device.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known non-transitory devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A method for conducting a transaction using a mobile device, the method comprising:
    receiving, by a mobile device, a request from a user to conduct a transaction using a financial transaction terminal;
    determining, by the mobile device, a location of the user;
    transmitting, by the mobile device to a bank server, the location of the user and the requested transaction;
    receiving, by the mobile device from the bank server, a determination of a location of the nearest financial transaction terminal that is capable of conducting the requested transaction and establishing a communication session using the mobile device, based upon the requested transaction and the location of the user;
    establishing, by the mobile device, a communication session with the nearest financial transaction terminal; and
    receiving, by the mobile device, a prompt from the financial transaction terminal for the user to complete the transaction.

2. The method according to claim 1, further comprising:
    receiving, by the mobile device, authentication information that the user inputted into the mobile device;
    transmitting, by the mobile device to a server, the authentication information for authentication of the user; and
    receiving, by the mobile device from the server, authentication of the user.

3. The method according to claim 2, further comprising transmitting, by the mobile device to the financial transaction terminal, authentication information of the user.

4. The method according to claim 1, further comprising communicating, by the mobile device, with the financial transaction terminal to transmit identification information of the mobile device or the user.

5. The method according to claim 1, further comprising receiving, by the mobile device, input from the user regarding the transaction for transmission to the financial transaction terminal, wherein the user provides input only into the mobile device when communicating with the financial transaction terminal.

6. The method according to claim 1, wherein establishing a communication session further comprises transmitting data from an NFC chip associated with the mobile device.

7. The method according to claim 1, further comprising:
    receiving, by the mobile device, a list of financial transaction terminals; and
    receiving, by the mobile device, a selection by the user of a financial transaction terminals terminal from the list.

8. The method according to claim 1, further comprising establishing a time limit for completing the transaction at the financial transaction terminal.

9. A method for conducting a transaction, the method comprising:
    receiving, from a mobile device, a request from a user to conduct a transaction using a financial transaction terminal;
    receiving, from the mobile device, a location of the user and the requested transaction;
    determining, by a computer, a location of the financial transaction terminal that is capable of conducting the requested transaction and establishing a communication session using the mobile device, based upon the requested transaction and the location of the user;
    establishing a communication session with the mobile device at the financial transaction terminal; and
    completing the transaction using the financial transaction terminal.

10. The method according to claim 9, further comprising:
    receiving, from the mobile device, authentication information input by the user into the mobile device; and
    authenticating, by a computer, the user based upon authentication information without requiring the user to input authentication information into the financial transaction terminal.

11. The method according to claim 9, wherein determining the location of the financial transaction terminal further comprises:
    identifying a list of financial transaction terminals in the vicinity of the user's location;
    confirming whether the requested transaction can be completed at each of the financial transaction terminals on the list; and
    presenting, to the mobile device, at least one financial transaction terminal from the list that can complete the requested transaction.

12. The method according to claim 9, wherein establishing a communication session further comprises:
    receiving, using an NFC reader of the financial transaction terminal, a signal from the mobile device; and
    processing the signal using the NFC reader of the financial transaction terminal.

13. The method according to claim 9, further comprising:
    receiving, by the financial transaction terminal, information about the transaction request of the user;
    upon establishing the communication session with the user, processing the request at the financial transaction terminal.

14. The method according to claim 9, further comprising establishing a time limit for completing the transaction at the financial transaction terminal.

15. A non-transitory computer readable medium having computer readable program code therein, the computer readable program code adapted to be executed by a processor to implement a method for conducting a transaction, the method comprising:
- providing a system, wherein the system comprises software modules, and wherein the software modules comprise a user interface module, a location module, a transmission module, and a session module;
- receiving, by the user interface module, a request from a mobile device of a user to conduct a transaction using a financial transaction terminal;
- determining, by the location module, a location of the user;
- transmitting, by the transmission module, the location of the user and the requested transaction;
- receiving, by the transmission module, a determination of a location of the nearest financial transaction terminal that is capable of conducting the requested transaction and establishing a communication session using the mobile device, based upon the requested transaction and the location of the user;
- establishing, by the session module, a communication session with the nearest financial transaction terminal; and
- receiving, by the session module, a prompt from the financial transaction terminal for the user to complete the requested transaction.

16. The non-transitory computer readable medium according to claim 15, further comprising:
- receiving, by the user interface module, authentication information that the use inputted into the mobile device;
- transmitting, by the transmission module, the authentication information for authentication of the user; and
- receiving, by the transmission module, authentication of the user.

17. The non-transitory computer readable medium according to claim 16, further comprising transmitting, by the session module, authentication information of the user.

18. The non-transitory computer readable medium according to claim 15, further comprising communicating, by the session module, with the financial transaction terminal to transmit identification information of the mobile device or the user.

19. The non-transitory computer readable medium according to claim 15, further comprising receiving, by the user interface module, input from the user regarding the transaction for transmission to the financial transaction terminal, wherein the user provides input only into the mobile device when communicating with the financial transaction terminal.

20. The non-transitory computer readable medium according to claim 15, further comprising:
- receiving, by the transmission module, a list of financial transaction terminals; and
- receiving, by the user interface module, a selection by the user of a financial transaction terminals from the list.

21. The non-transitory computer readable medium according to claim 15, further comprising installing the system on the mobile device.

* * * * *